US011859802B1

(12) United States Patent
Larson

(10) Patent No.: US 11,859,802 B1

(45) Date of Patent: Jan. 2, 2024

(54) MOOD INDICATING ASSEMBLY

(71) Applicant: Richard Larson, Sedro-Woolley, WA (US)

(72) Inventor: Richard Larson, Sedro-Woolley, WA (US)

( * ) Notice: Subject to any disclaimer, the term of this patent is extended or adjusted under 35 U.S.C. 154(b) by 0 days.

(21) Appl. No.: 18/091,059

(22) Filed: Dec. 29, 2022

(51) Int. Cl.

| | |
|---|---|
| ***F21V 23/00*** | (2015.01) |
| ***F21V 23/04*** | (2006.01) |
| ***F21S 9/02*** | (2006.01) |
| ***F21V 17/10*** | (2006.01) |
| ***G08B 5/36*** | (2006.01) |

(52) U.S. Cl.

CPC .............. *F21V 23/003* (2013.01); *F21S 9/02* (2013.01); *F21V 17/101* (2013.01); *F21V 23/04* (2013.01); *F21V 23/0407* (2013.01); *G08B 5/36* (2013.01)

(58) Field of Classification Search

CPC ........ F21S 9/02; F21V 23/04; F21V 23/0407; F21L 4/02; F21L 4/022; F21L 4/08; F21L 4/005; G08B 5/36

See application file for complete search history.

(56) References Cited

U.S. PATENT DOCUMENTS

| | | | | |
|---|---|---|---|---|
| 4,059,952 | A | 11/1977 | Kaestner | |
| 4,551,620 | A | 11/1985 | Rashev | |
| 5,382,165 | A | 1/1995 | Knox | |
| D355,898 | S | 2/1995 | Verderame | |
| 9,508,008 | B2 | 11/2016 | Jerauld | |
| 2006/0082987 | A1* | 4/2006 | Dorsey | F21V 23/04 160/10 |
| 2011/0209501 | A1 | 9/2011 | Scott | |
| 2014/0111981 | A1* | 4/2014 | Watanabe | F21L 13/06 362/184 |
| 2019/0272763 | A1* | 9/2019 | Yachnes | F21S 9/02 |
| 2021/0244121 | A1* | 8/2021 | Olivas | F21V 33/008 |

FOREIGN PATENT DOCUMENTS

| | | | | |
|---|---|---|---|---|
| EP | 3070668 | A1 * | 9/2016 | |
| WO | WO-2014012420 | A1 * | 1/2014 | F21L 4/00 |

OTHER PUBLICATIONS

Machine translation of Wang, WO 2014/012420 A1, published Jan. 23, 2014 (Year: 2014).*

Machine translation of Miglar, EP 3070668, published Sep. 21, 2016 (Year: 2016).*

* cited by examiner

*Primary Examiner* — William N Harris

(57) ABSTRACT

A mood indicating assembly includes a housing that is positionable on a support surface. A plurality of light bars is each disposed on the housing to emit light outwardly from the housing. Each of the plurality of light bars is independently actuatable ranging between a minimum number of the plurality light bars and a maximum number of the plurality of light bars. In this way the plurality of light bars facilitate a user to visually communicate an intensity of their mood to a colleague. Each of the plurality of light bars emits light of a unique color with respect to each other to facilitate the user to visually communicate their stress level to the colleague thereby facilitating the colleague to choose to avoid disturbing the user.

8 Claims, 5 Drawing Sheets

MOOD INDICATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mood devices and more particularly pertains to a new mood device for visually communicating a user's mood. The device includes a housing and a plurality of light bars disposed on the housing. A selected number of the light bars can be turned on to indicate an intensity of the user's mood. Furthermore, each of the light bars is actuatable to emit a variety of colors of light to visually communicate whether the user is in a positive mood or a negative mood.

(2) Description of Related Art Including Information Disclosed Under 37 CFR 1.97 and 1.98

The prior art relates to mood devices including a biorhythm calculator that has a plurality of dials for selecting a user's physical, emotional and intellectual state. The prior art discloses a biorhythm calculator that has a cylinder with a plurality of gear driven drums with numbers printed on the drums for indicating an emotional state of a user. The prior art discloses a calorie counter that has a plurality of sliding balls for counting calories. The prior art discloses an emotion display that includes an article of jewelry and a bead slidably integrated into the article of jewelry that can be positioned to indicate various emotional states.

BRIEF SUMMARY OF THE INVENTION

An embodiment of the disclosure meets the needs presented above by generally comprising a housing that is positionable on a support surface. A plurality of light bars is each disposed on the housing to emit light outwardly from the housing. Each of the plurality of light bars is independently actuatable ranging between a minimum number of the plurality light bars and a maximum number of the plurality of light bars. In this way the plurality of light bars facilitate a user to visually communicate an intensity of their mood to a colleague. Each of the plurality of light bars emits light of a unique color with respect to each other to facilitate the user to visually communicate their stress level to the colleague thereby facilitating the colleague to choose to avoid disturbing the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
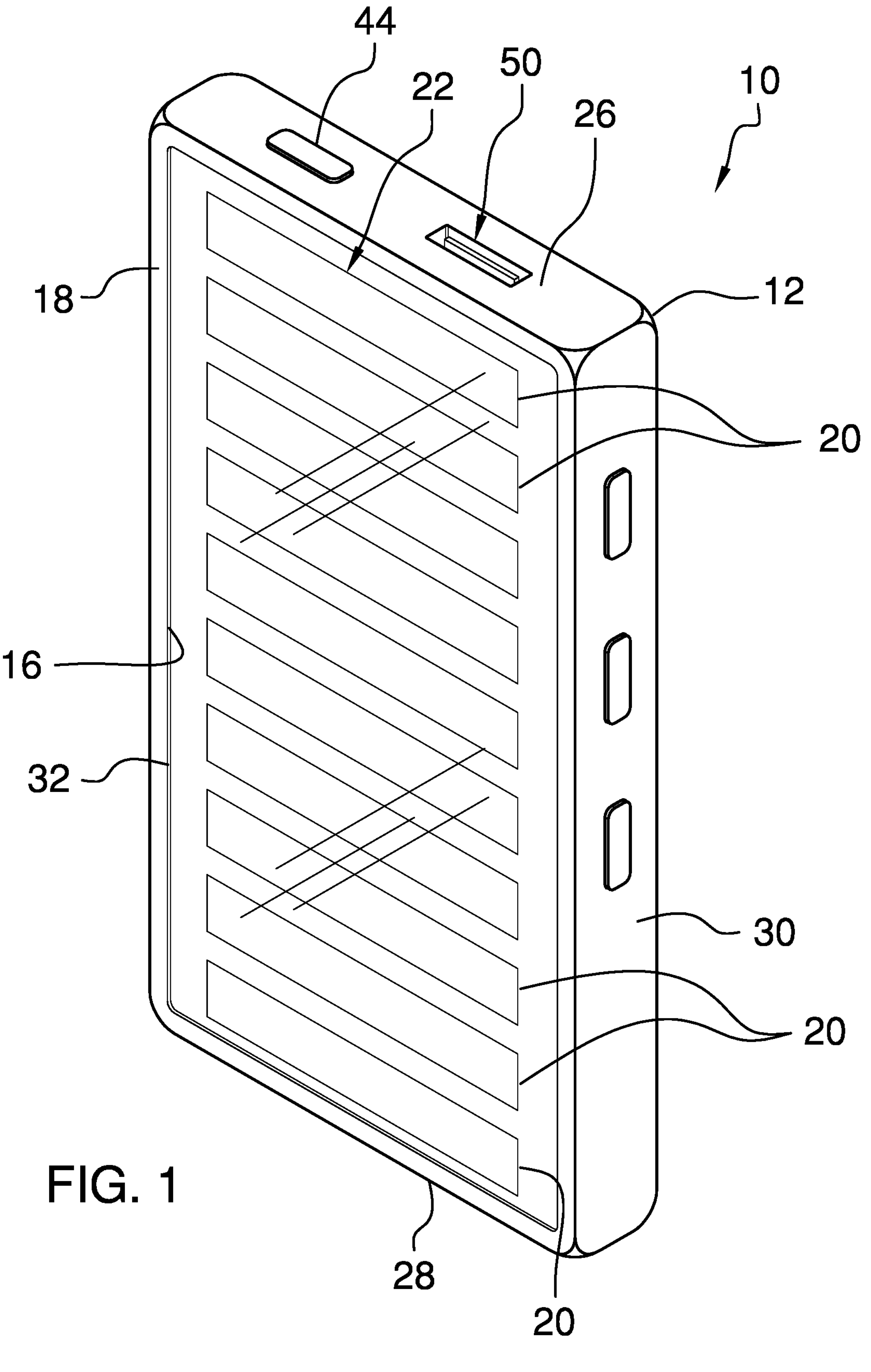
FIG. 1 is a front perspective view of a mood indicating assembly according to an embodiment of the disclosure.
Figure 2:
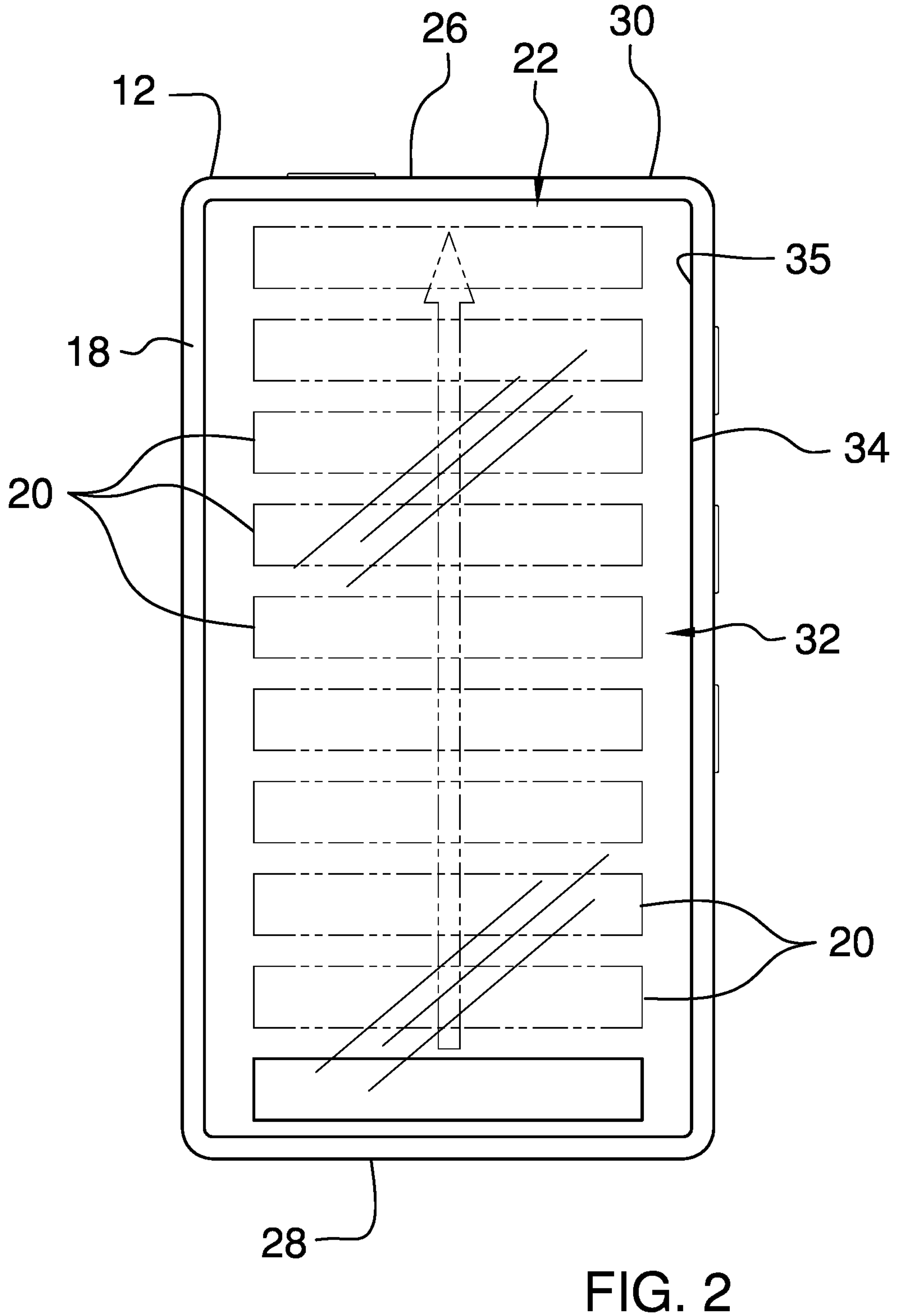
FIG. 2 is a front view of an embodiment of the disclosure.
Figure 3:
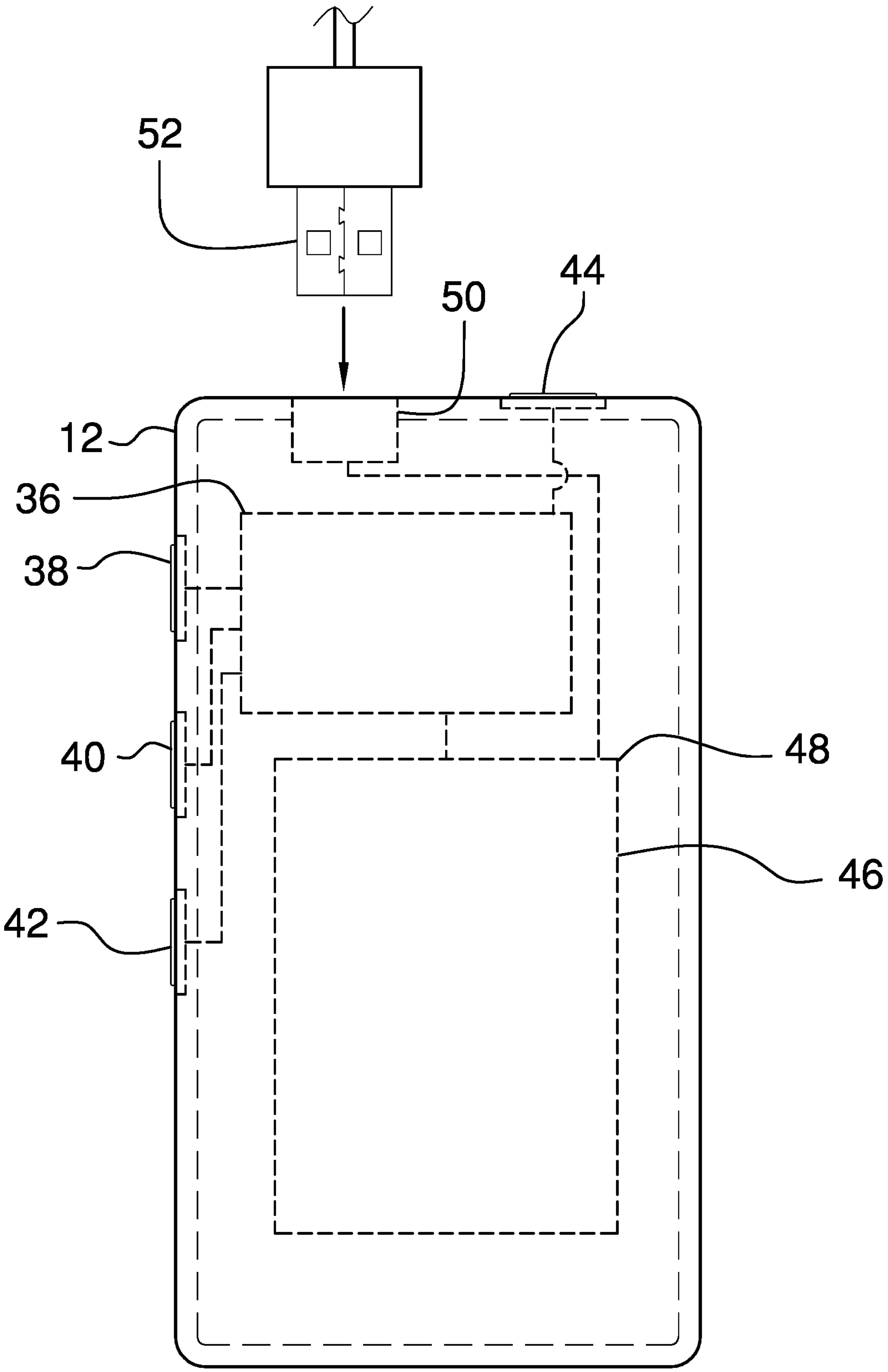
FIG. 3 is a back phantom view of an embodiment of the disclosure.
Figure 4:
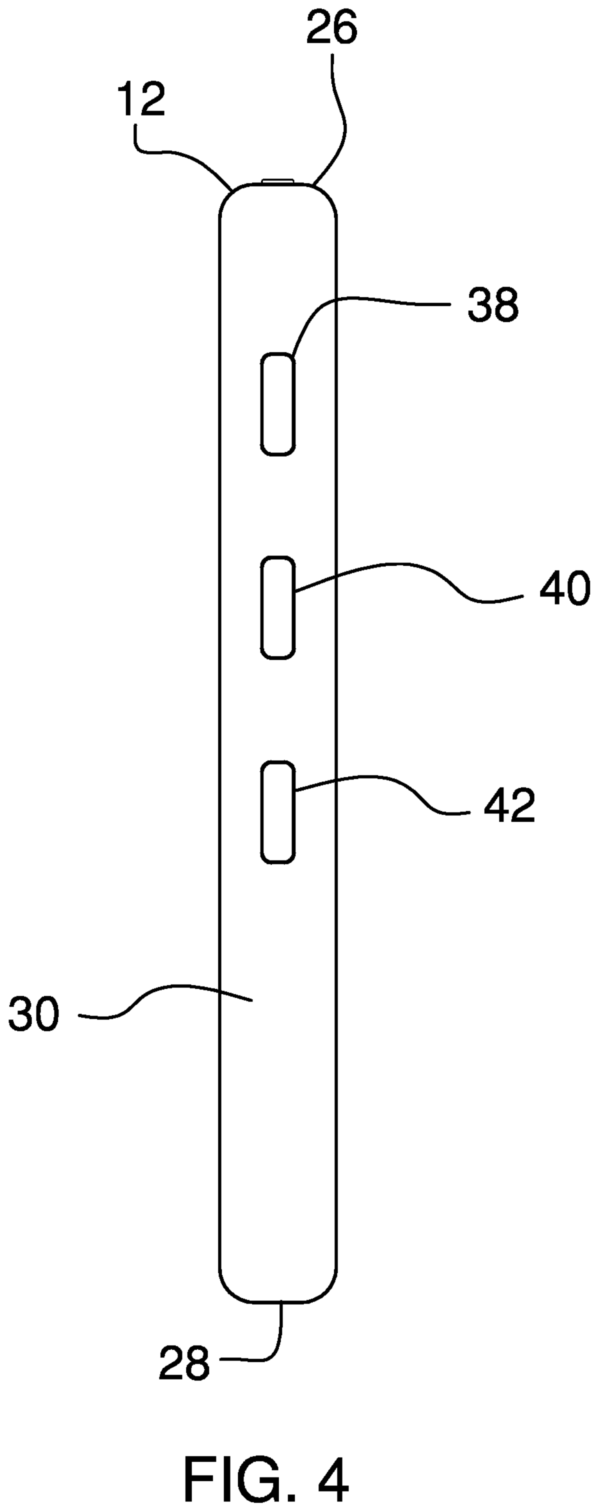
FIG. 4 is a right side view of an embodiment of the disclosure.
Figure 5:
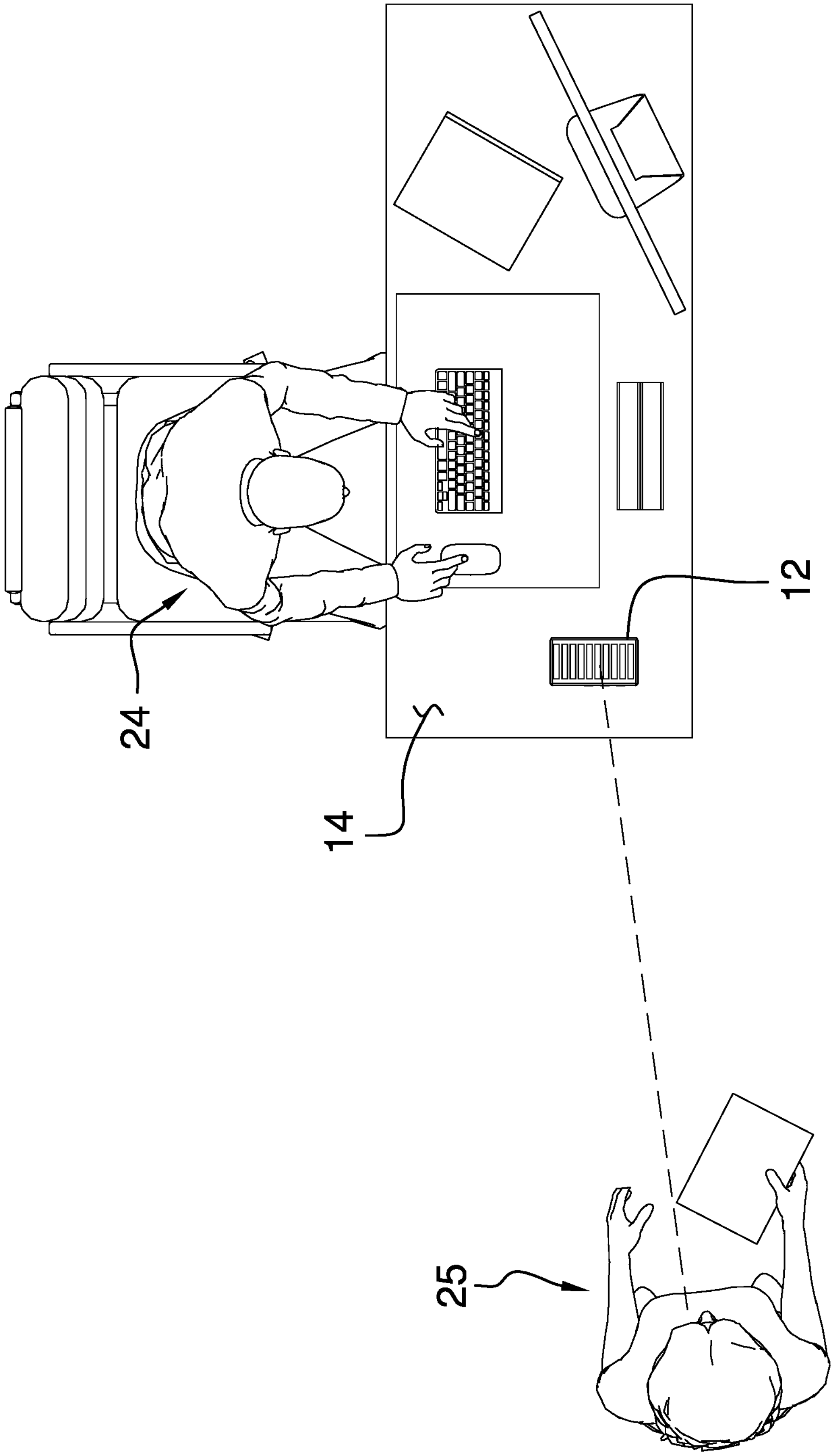
FIG. 5 is a perspective in-use view of an embodiment of the disclosure.

With reference now to the drawings, and in particular to FIGS. 1 through 5 thereof, a new mood device embodying the principles and concepts of an embodiment of the disclosure and generally designated by the reference numeral 10 will be described.

As best illustrated in FIGS. 1 through 5, the mood indicating assembly 10 generally comprises a housing 12 that is positionable on a support surface 14. The housing 12 has a recess 16 that is integrated into a top wall 18 of the housing 12 and the recess 16 covers a substantial area of the top wall 18. The housing 12 may have a length of approximately 15.0 cm, a width of approximately 8.0 cm and a thickness of approximately 16.0 mm. A plurality of light bars 20 is disposed on the housing 12 to emit light outwardly from the housing 12 and the plurality of light bars 20 is arranged in a column 22 on the housing 12. Each of the plurality of light bars 20 is independently actuatable. Furthermore, a selected number of the plurality of light bars 20 is actuatable ranging between a minimum number of the plurality light bars 20 and a maximum number of the plurality of light bars 20. In this way the plurality of light bars 20 facilitates a user 24 to visually communicate an intensity of their mood to a colleague 25.

Each of the plurality of light bars 20 emits light of a unique color with respect to each other to facilitate the user 24 to visually communicate their stress level to the colleague. In this way the colleague can choose to avoid disturbing the user 24. Each of the plurality of light bars 20 is positioned in the recess 16 in the top wall 18 of the housing 12 and each of the plurality of light bars 20 is elongated to extend across a substantial width of the recess 16. Furthermore, the plurality of light bars 20 is evenly spaced apart from each other and is distributed between a top side 26 and a bottom side 28 of a perimeter wall 30 of the housing 12. Each of the plurality of light bars 20 may comprise a light emitting diode or other type of electronic light emitter. A window 32 is positioned in the recess 16 such that the window 32 covers the plurality of light bars 20 and the window 32 has an outer edge 34 which is bonded to a bounding edge 35 of the recess 16. The window 32 is comprised of a translucent material configured to pass light through the window 32.

A control circuit 36 is integrated into the housing 12 and the control circuit 36 receives an on input, and off input, a flash input, a color input and a distress input. Each of the plurality of light bars 20 is electrically coupled to the control circuit 36. The plurality of light bars 20 is actuated into a standby condition when the control circuit 36 receives the on input and the plurality of light bars 20 is de-actuated when the control circuit 36 receives the off input. The plurality of light bars 20 is actuated to repeatedly flash on and off when the control circuit 36 receives the flash input and the plurality of light bars 20 is actuated to emit a selected color of light when the control circuit 36 receives the color input. Furthermore, all of the plurality of light bars 20 is actuated when the control circuit 36 receives the distress input to visually communicate that the user 24 is under distress.

A color button 38 is movably integrated into the perimeter wall 30 of the housing 12 and the color button 38 is electrically coupled to the control circuit 36. The control circuit 36 receives the color input each time the color button 38 is depressed to facilitate the user 24 to chose the color of light emitted by the plurality of light bars 20. The colors of light may range between white to communicate a mild mood to increasing intensities of red to communicate increasingly negative moods. A flash button 40 is movably integrated into the perimeter wall 30 of the housing 12 and the flash button 40 is electrically coupled to the control circuit 36. The control circuit 36 receives the flash input when the flash button 40 is depressed.

A power button 42 is movably integrated into the perimeter wall 30 of the housing 12 and the power button 42 is electrically coupled to the control circuit 36. The control circuit 36 receives the on input when the power button 42 is initially depressed and the control circuit 36 receives the off input when the power button 42 is subsequently depressed. A distress button 44 is movably integrated into the perimeter wall 30 of the housing 12 and the distress button 44 is electrically coupled to the control circuit 36. Additionally, the control circuit 36 receives the distress input when the distress button 44 is depressed.

A power supply 46 is integrated into the housing 12 and the power supply 46 is electrically coupled to the control circuit 36. The power supply 46 comprises at least one battery 48 that is integrated into the housing 12. The at least one battery 48 is electrically coupled to the control circuit 36. The power supply 46 includes a charge port 50 that is recessed into the perimeter wall 30 of the housing 12 thereby facilitating the charge port 50 to receive a charge cord 52. The charge port 50 is electrically coupled to the at least one battery 48 for charging the at least one battery 48.

In use, the housing 12 is placed in a conspicuous location, such as a desk in the user's 24 office, for example, or other location that is visible to the user's colleagues 25. The user 24 depresses the power button 42 to actuate the plurality of light bars 20 and the user 24 depresses the power button 42 a chosen number of times to turn on a chosen number of the light bars 20. In this way the user 24 can visually communication the intensity of their mood based on the number of light bars 20 that is illuminated. Additionally, the color button 38 is depressed to select the color of light emitted by the plurality of light bars 20. In this way the user 24 can visually communicate the type of their mood with respect to negative moods or positive moods. In this way the user's colleagues 25 can quickly identify if they should not disturb the user 24 or if the user 24 is in an approachable mood.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mood indicating assembly for facilitating a user to visually communicate their current mood to a colleague, said assembly comprising:

a housing being positionable on a support surface;

a plurality of light bars, each of said light bars being disposed on said housing wherein each of said plurality of light bars is configured to emit light outwardly from said housing, said plurality of light bars being arranged in a column on said housing, each of said plurality of light bars being independently actuatable, a selected number of said plurality of light bars being actuatable ranging between a minimum number of said plurality light bars and a maximum number of said plurality of light bars wherein said plurality of light bars is configured to facilitate a user to visually communicate an intensity of their mood to a colleague, each of said plurality of light bars emitting light of a unique color with respect to each other wherein said plurality of light bars is configured to facilitate the user to visually communicate their stress level to the colleague thereby facilitating the colleague to choose to avoid disturbing the user;

wherein said housing has a recess being integrated into a top wall of said housing, said recess covering a substantial area of said top wall;

wherein each of said plurality of light bars is positioned in said recess in said top wall of said housing, each of said plurality of light bars being elongated to extend across a substantial width of said recess, said plurality of light bars being evenly spaced apart from each other and being distributed between a top side and a bottom side of a perimeter wall of said housing; and wherein said assembly includes a window being positioned in said recess such that said window covers said plurality of light bars, said window having an outer edge being bonded to a bounding edge of said recess, said window being comprised of a translucent material wherein said window is configured to pass light through said window.

2. A mood indicating assembly for facilitating a user to visually communicate their current mood to a colleague, said assembly comprising:

a housing being positionable on a support surface;

a plurality of light bars, each of said light bars being disposed on said housing wherein each of said plurality of light bars is configured to emit light outwardly from said housing, said plurality of light bars being arranged in a column on said housing, each of said plurality of light bars being independently actuatable, a selected number of said plurality of light bars being actuatable ranging between a minimum number of said plurality light bars and a maximum number of said plurality of light bars wherein said plurality of light bars is configured to facilitate a user to visually communicate an intensity of their mood to a colleague, each of said plurality of light bars emitting light of a unique color with respect to each other wherein said plurality of light bars is configured to facilitate the user to visually communicate their stress level to the colleague thereby facilitating the colleague to choose to avoid disturbing the user;

wherein said assembly includes a control circuit being integrated into said housing, said control circuit receiving an on input, an off input, a flash input, a color input, and a distress input, each of said plurality of light bars being electrically coupled to said control circuit;

wherein said plurality of light bars is actuated into a standby condition when said control circuit receives said on input;

wherein said plurality of light bars is de-actuated when said control circuit receives said off input;

wherein said plurality of light bars is actuated to repeatedly flash on and off when said control circuit receives said flash input;

wherein said plurality of light bars is actuated to emit a selected color of light when said control circuit receives said color input, and wherein all of said plurality of light bars is actuated when said control circuit receives said distress input wherein said plurality of light bars is configured to visually communicate that the user is under distress.

3. The assembly according to claim 2, further comprising a color button being movably integrated into said perimeter wall of said housing, said color button being electrically coupled to said control circuit, said control circuit receiving said color input each time said color button is depressed wherein said color button is configured to facilitate the user to chose the color of light emitted by said plurality of light bars.

4. The assembly according to claim 2, further comprising a flash button being movably integrated into said perimeter wall of said housing, said flash button being electrically coupled to said control circuit, said control circuit receiving said flash input when said flash button is depressed.

5. The assembly according to claim 2, further comprising a power button being movably integrated into said perimeter wall of said housing, said power button being electrically coupled to said control circuit, said control circuit receiving said on input when said power button is initially depressed, said control circuit receiving said off input when said power button is subsequently depressed.

6. The assembly according to claim 2, further comprising a distress button being movably integrated into said perimeter wall of said housing, said distress button being electrically coupled to said control circuit, said control circuit receiving said distress input when said distress button is depressed.

7. The assembly according to claim 2, further comprising a power supply being integrated into said housing, said power supply being electrically coupled to said control circuit, said power supply comprising:

at least one battery being integrated into said housing, said at least one battery being electrically coupled to said control circuit; and a charge port being recessed into said perimeter wall of said housing thereby facilitating said charge port to receive a charge cord, said charge port being electrically coupled to said at least one battery for charging said at least one battery.

8. A mood indicating assembly for facilitating a user to visually communicate their current mood to a colleague, said assembly comprising:

a housing being positionable on a support surface, said housing having a recess being integrated into a top wall of said housing, said recess covering a substantial area of said top wall;

a plurality of light bars, each of said light bars being disposed on said housing wherein each of said plurality of light bars is configured to emit light outwardly from said housing, said plurality of light bars being arranged in a column on said housing, each of said plurality of light bars being independently actuatable, a selected number of said plurality of light bars being actuatable ranging between a minimum number of said plurality light bars and a maximum number of said plurality of light bars wherein said plurality of light bars is configured to facilitate a user to visually communicate an intensity of their mood to a colleague, each of said plurality of light bars emitting light of a unique color with respect to each other wherein said plurality of light bars is configured to facilitate the user to visually communicate their stress level to the colleague thereby facilitating the colleague to choose to avoid disturbing the user, each of said plurality of light bars being positioned in said recess in said top wall of said housing, each of said plurality of light bars being elongated to extend across a substantial width of said recess, said plurality of light bars being evenly spaced apart from each other and being distributed between a top side and a bottom side of a perimeter wall of said housing;

a window being positioned in said recess such that said window covers said plurality of light bars, said window having an outer edge being bonded to a bounding edge of said recess, said window being comprised of a translucent material wherein said window is configured to pass light through said window;

a control circuit being integrated into said housing, said control circuit receiving an on input, an off input, a flash input, a color input, and a distress input, each of said plurality of light bars being electrically coupled to said control circuit, said plurality of light bars being actuated into a standby condition when said control circuit receives said on input, said plurality of light bars being de-actuated when said control circuit receives said off input, said plurality of light bars being actuated to repeatedly flash on and off when said control circuit receives said flash input, said plurality of light bars being actuated to emit a selected color of light when said control circuit receives said color input, all of said plurality of light bars being actuated when said control circuit receives said distress input wherein said plurality of light bars is configured to visually communicate that the user is under distress;

a color button being movably integrated into said perimeter wall of said housing, said color button being electrically coupled to said control circuit, said control circuit receiving said color input each time said color button is depressed wherein said color button is configured to facilitate the user to chose the color of light emitted by said plurality of light bars;

a flash button being movably integrated into said perimeter wall of said housing, said flash button being electrically coupled to said control circuit, said control circuit receiving said flash input when said flash button is depressed;

a power button being movably integrated into said perimeter wall of said housing, said power button being electrically coupled to said control circuit, said control circuit receiving said on input when said power button is initially depressed, said control circuit receiving said off input when said power button is subsequently depressed;

a distress button being movably integrated into said perimeter wall of said housing, said distress button being electrically coupled to said control circuit, said control circuit receiving said distress input when said distress button is depressed;

a power supply being integrated into said housing, said power supply being electrically coupled to said control circuit, said power supply comprising:

at least one battery being integrated into said housing, said at least one battery being electrically coupled to said control circuit; and a charge port being recessed into said perimeter wall of said housing thereby facilitating said charge port to receive a charge cord, said charge port being electrically coupled to said at least one battery for charging said at least one battery.

* * * * *